United States Patent
Molesky

(10) Patent No.: US 7,146,374 B1
(45) Date of Patent: Dec. 5, 2006

(54) AUTOMATED MULTI-LINE LABELING OF A TIME AXIS

(75) Inventor: Lory Dean Molesky, Arlington, MA (US)

(73) Assignee: Oracle Corporation, Redwood Shores, CA (US)

( * ) Notice: Subject to any disclaimer, the term of this patent is extended or adjusted under 35 U.S.C. 154(b) by 161 days.

(21) Appl. No.: 09/788,459

(22) Filed: Feb. 21, 2001

(51) Int. Cl.
G06F 7/00 (2006.01)
G06T 17/00 (2006.01)

(52) U.S. Cl. .................. 707/102; 707/100; 707/104.1; 345/440; 345/440.2

(58) Field of Classification Search ............. 707/1–10, 707/100–104.1; 345/619, 679, 853–855, 345/440–440.2, 767–777; 715/440–440.2, 715/767, 774
See application file for complete search history.

(56) References Cited

U.S. PATENT DOCUMENTS

| | | | | |
|---|---|---|---|---|
| 5,414,838 A | * | 5/1995 | Kolton et al. ............. 707/104.1 |
| 5,461,708 A | * | 10/1995 | Kahn ......................... 345/440 |
| 5,485,564 A | * | 1/1996 | Miura ........................ 345/440 |
| 5,581,677 A | * | 12/1996 | Myers et al. ............... 345/440 |
| 5,581,678 A | * | 12/1996 | Kahn ......................... 345/440 |
| 5,596,691 A | * | 1/1997 | Good et al. ................. 345/440 |
| 5,748,188 A | * | 5/1998 | Hu et al. .................. 707/104.1 |
| 5,894,311 A | * | 4/1999 | Jackson ...................... 345/440 |
| 5,895,451 A | * | 4/1999 | Yamade et al. ............. 345/963 |
| 5,905,814 A | * | 5/1999 | Mochizuki et al. ......... 382/239 |
| 5,914,715 A | * | 6/1999 | Sasaki ........................ 715/803 |
| 6,023,703 A | * | 2/2000 | Hill ............................ 707/100 |
| 6,064,401 A | * | 5/2000 | Holzman et al. ........... 345/440 |
| 6,075,530 A | * | 6/2000 | Lucas et al. ................ 715/804 |
| 6,081,809 A | * | 6/2000 | Kumagai ................. 707/104.1 |
| 6,091,424 A | * | 7/2000 | Madden et al. ............. 345/619 |
| 6,157,929 A | * | 12/2000 | Zamiska et al. ............ 707/200 |
| 6,219,050 B1 | * | 4/2001 | Schaffer ..................... 345/853 |
| 6,230,064 B1 | * | 5/2001 | Nakase et al. .............. 345/764 |
| 6,243,105 B1 | * | 6/2001 | Hoyer et al. ................ 345/440 |
| 6,262,728 B1 | * | 7/2001 | Alexander ............... 345/440.1 |
| 6,275,229 B1 | * | 8/2001 | Weiner et al. ................. 707/3 |
| 6,320,577 B1 | * | 11/2001 | Alexander ............... 345/440.1 |
| 6,320,585 B1 | * | 11/2001 | Engel et al. ................ 345/440 |
| 6,380,953 B1 | * | 4/2002 | Mizuno ...................... 345/764 |

(Continued)

OTHER PUBLICATIONS

"Automatically Labeling Web Pages Based on Normal User Actions"—Jeremy Goecks and Jude Shavlik—Proceedings of the IJCAI-99 Workshop on Machine Learning for Information Filtering (5 pages).*

(Continued)

Primary Examiner—Jean M. Corrielus
Assistant Examiner—Anh Ly
(74) Attorney, Agent, or Firm—Bingham McCutchen LLP

(57) ABSTRACT

The present invention is an automated method and system of labeling of the axes of a graph with time based data. The present invention uses multi-level time labels to label the time axis of a graph. The invention generates a set of time labels by processing the input data; the time axis labels stores the set of data in a multi-level data structure. The multi-level data structure is processed to refine the time labels. The refining step includes adjusting the time labels so that they fit in the space provided along the axis and refining the multi-level time labels to make the labeled axis more readable. The time labels are then used to generate multi-level time labels. These multi-level time labels are used to label the axis of the graph. The invention automatically provides an effective, elegant, labeled time based graph.

28 Claims, 6 Drawing Sheets

U.S. PATENT DOCUMENTS

| | | | |
|---|---|---|---|
| 6,421,828 B1* | 7/2002 | Wakisaka et al. | 345/858 |
| 6,477,536 B1* | 11/2002 | Pasumansky et al. | 707/102 |
| 6,496,817 B1* | 12/2002 | Whang et al. | 707/2 |
| 6,516,324 B1* | 2/2003 | Jones et al. | 707/104.1 |
| 6,529,217 B1* | 3/2003 | Maguire et al. | 345/440 |
| 6,581,068 B1* | 6/2003 | Bensoussan et al. | 707/104.1 |
| 6,597,378 B1* | 7/2003 | Shiraishi et al. | 715/764 |
| 6,611,142 B1* | 8/2003 | Jones et al. | 324/261 |
| 6,816,870 B1* | 11/2004 | Nishimura et al. | 707/104.1 |
| 6,920,608 B1* | 7/2005 | Davis | 715/503 |
| 2002/0030683 A1* | 3/2002 | Alexander | 345/440.1 |
| 2002/0131625 A1* | 9/2002 | Vining et al. | 382/128 |
| 2003/0058239 A1* | 3/2003 | Wall et al. | 345/419 |
| 2003/0064527 A1* | 4/2003 | Lubman et al. | 436/174 |
| 2003/0071814 A1* | 4/2003 | Jou et al. | 345/440 |
| 2005/0165842 A1* | 7/2005 | Nishimura et al. | 707/104.1 |
| 2005/0172218 A1* | 8/2005 | Nishimura et al. | 715/512 |
| 2005/0198042 A1* | 9/2005 | Davis | 707/10 |

OTHER PUBLICATIONS

IBM Technical Disclosure Bulletin—"Method for Automatic labeling of a Pie Chart that is Created from a Multi-Component Chart" IBM- Oct. 1985 (pp. 1-5).* www.klgroup.com (see attached printout 1st page of website is included).

www.visualmining.com (see attached printout 1st page of website is included).

www.threedgraphics.com (see attached printout 1st page of website is included).

* cited by examiner

Figure 6a

| L0: | 5pm [0,1] | 6pm [1,2] | 7pm [2,3] | 8pm [3,4] | 9pm [4,5] | 10pm [5,6] | 11pm [6,7] | 12am [7,8] |
|---|---|---|---|---|---|---|---|---|
| L1: | Mon [0,7] | | | | | | | Tue [7,8] |
| L2: | 15 [0,1] | 16 [1,2] | 17 [2,3] | 18 [3,4] | 19 [4,5] | 20 [5,6] | 21 [6,7] | 22 [7,8] |
| L3: | Nov. [0,8] | | | | | | | |
| L4: | 2000 [0,8] | | | | | | | |

Figure 6b

| L0: | 5:30pm [0,1] | 6pm [1,2] | 7pm [2,3] | 8pm [3,4] | 9pm [4,5] | 10pm [5,6] | 11pm [6,7] | 12am [7,8] |
|---|---|---|---|---|---|---|---|---|
| L1: | Mon [0,7] | | | | | | | Tue [7,8] |
| L2: | 15 [0,1] | 16 [1,2] | 17 [2,3] | 18 [3,4] | 19 [4,5] | 20 [5,6] | 21 [6,7] | 22 [7,8] |
| L3: | Nov. 2000 [0,8] | | | | | | | |
| L4: | | | | | | | | |

AUTOMATED MULTI-LINE LABELING OF A TIME AXIS

FIELD OF THE INVENTION

The present invention relates to a method of labeling the axes of graphs and charts.

BACKGROUND OF THE INVENTION

Effectively conveying time-based data often requires creating charts and graphs that are easily understood and appreciated. In today's business world, a superior presentation of data may greatly impact a business's performance. The primary purpose of a graph is to quickly communicate information to an intended audience. An effective graph conveys information to a viewer in a clear, well-designed and unambiguous manner. Thus, an effective graph has meaningful labels, clear axis marks, organization, and is uncluttered. The success of graph often depends upon whether the graph and its labels are aesthetically pleasing.

Graphs and charts are used in a variety of fields, such as finance, e-commerce, communications, consulting, accounting, law, marketing, sales, etc. More and more these businesses are having to deal with a large influx of data and they must find a way to quickly and effectively communicate the data. As data becomes more available businesses need an automated process to create comprehendible graphs and charts. This need is most acute when handling time based data because, time units have unusual variations and particularities. Thus, an automated process that converts time based data into an elegantly labeled graph is needed.

The automated labeling of a time axis is one of the most challenging components of any charting software. Commercially available charting software does not automate the labeling of the time axis in a way that is visually pleasing. For example, many spread sheet packages only use a single line of text to label the time axis. The resulting chart is cluttered and has redundant labels. In contrast, leading business publications employ multi-line labeling of the time axis in their presentation graphics. However, these labels are not automated and require human operators (e.g. graphic artists) to perform the layout manually. Thus, the general problem is finding a method to elegantly and automatically label a chart or a graph with a time axis for any time unit.

SUMMARY OF THE INVENTION

The present invention is an automated method and system of labeling of the axes of a graph. The present invention dynamically labels a graph axis with time based data. The labels on the axis adjust for the amount and type of data provided. The labels have multiple levels so that graph appears uncluttered and adjust for a display's size.

The invention generates a set of time labels by processing the input data; the time labels are stored in a multi-level data structure. The multi-level data structure is then processed to redefine the time labels. The refining step includes adjusting the labels so that they fit in the space provided along the axis. The time labels that are stored in the multi-level data structure are then used to generate multi-level time labels. These multi-level time labels are used to label the axis of the graph. The invention automatically provides an effective, elegant, labeled time based graph.

One of the advantages of the current invention is that the software creates a dynamically labeled time axis that adjusts for the display size and for the amount of data that is provided. Further, the present invention automatically generates an elegant layout based on the data provided, the available real estate (i.e. the length of the time axis) and the desired font.

Another advantage of the invention is that the method of labeling may be applied to any type of charting software. The process is generic and is not software specific.

Another advantage of the present invention is that knowledge of time units and their peculiarities is built into the system thereby enabling "known" time labels.

Another advantage of the invention is that the present invention is independent of any display device and, hence it can be utilized for any type display device.

Yet another advantage of the invention is that knowledge of the displays may be built into the system, enabling automatic labeling and gridding.

Yet another advantage of the present invention is that is produces non-cluttered multi-level labels for a graph.

BRIEF DESCRIPTION OF THE DRAWINGS

The details of the present invention, both as to its structure and operation can best be understood by referring to the accompanying drawings.

FIGS. 6a and 6b are exemplary diagrams of multi-level data structures.

DETAILED DESCRIPTION OF THE INVENTION

Figure 1:
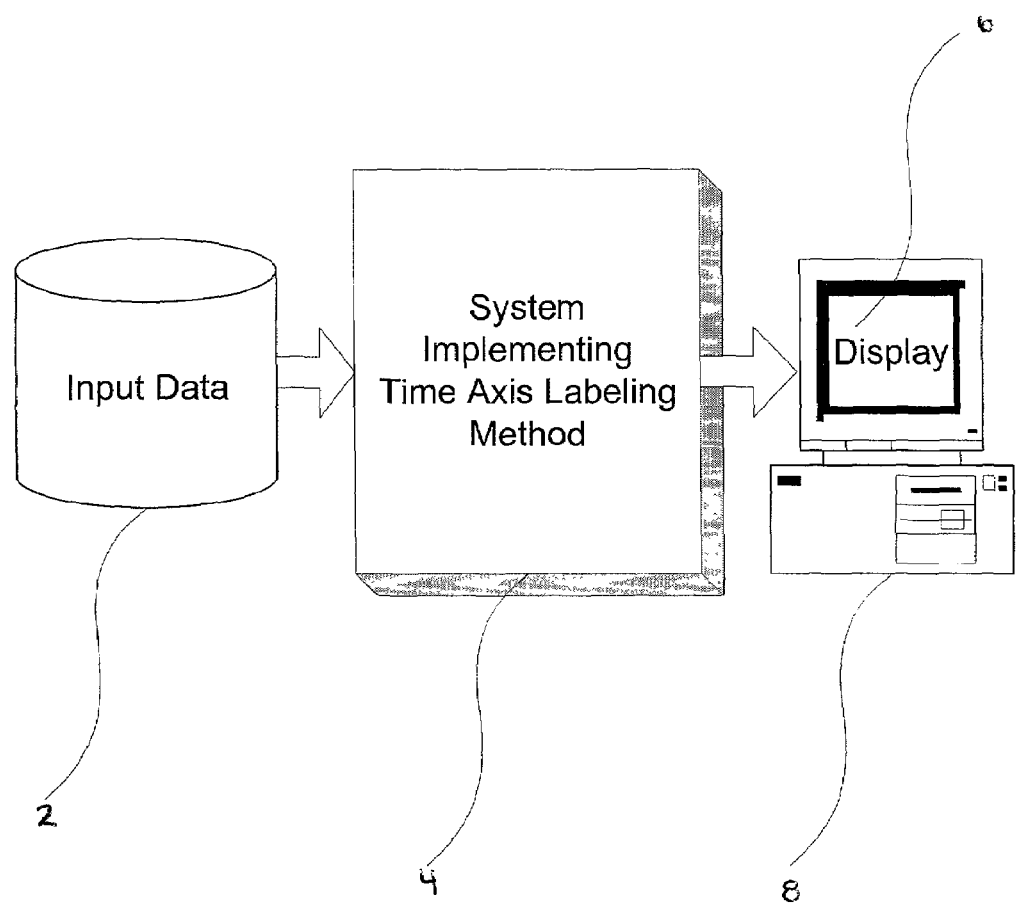
FIG. 1 is an environmental diagram showing the data flow in the present invention.

The present invention is a method and system for automatically labeling an axis of a graph with time based data. The data flow of the present invention is provided in FIG. 1. Input data 2 is provided to a system implementing the time axis labeling 4. The input data 2 is processed by the time axis labeling method 4 and a labeled graph is outputted on a display device 6. The display device 6 may be the screen of a computer 8, a printer, or the like. An exemplary diagram of a display device 6 showing a labeling graph is provided in FIG. 2. The labeled graph has a time axis 10 and multi-level time labels 12. The labeled graph also has an informational data axis 14.

As provided in FIG. 1, input data 2 includes the length of the time axis 10, the size and type of font used to label the time axis 10, informational data and corresponding timestamps, and time units of the inputted timestamps. The time units, such as days, minutes or seconds, may be defined by the user or selected from a time dimension hierarchy. A time dimension hierarchy is a predefined array of time units. One example of a time dimension hierarchy is "Year, Month, Day, Minute, Second". Another example of a time dimension hierarchy is "Year, Month, Week, Day". Any type of time unit may be included in the time dimension hierarchy such as milliseconds or ½.

Figure 2:
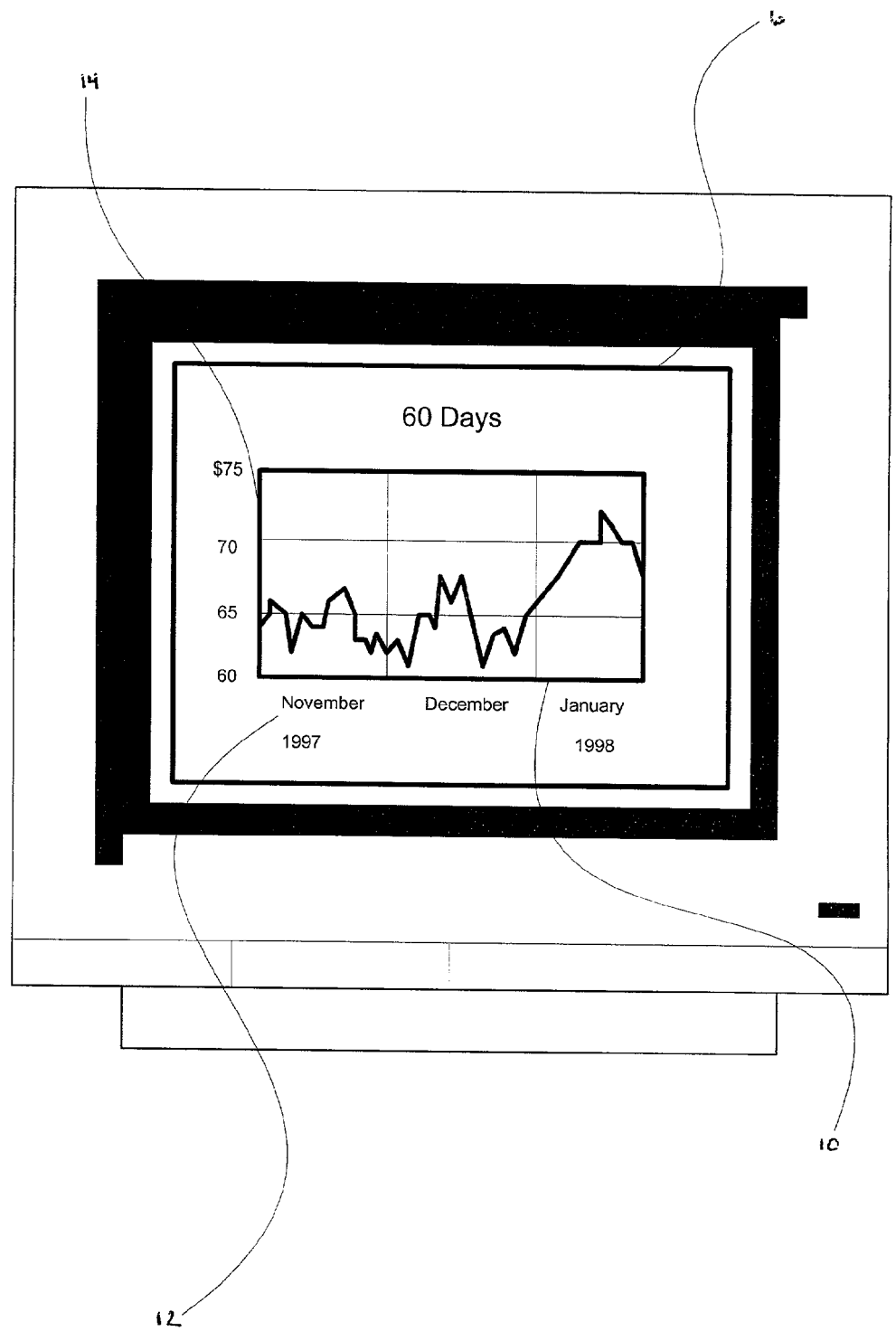
FIG. 2 is an example of a graph with a labeled time axis shown on a display device.
Figure 3:
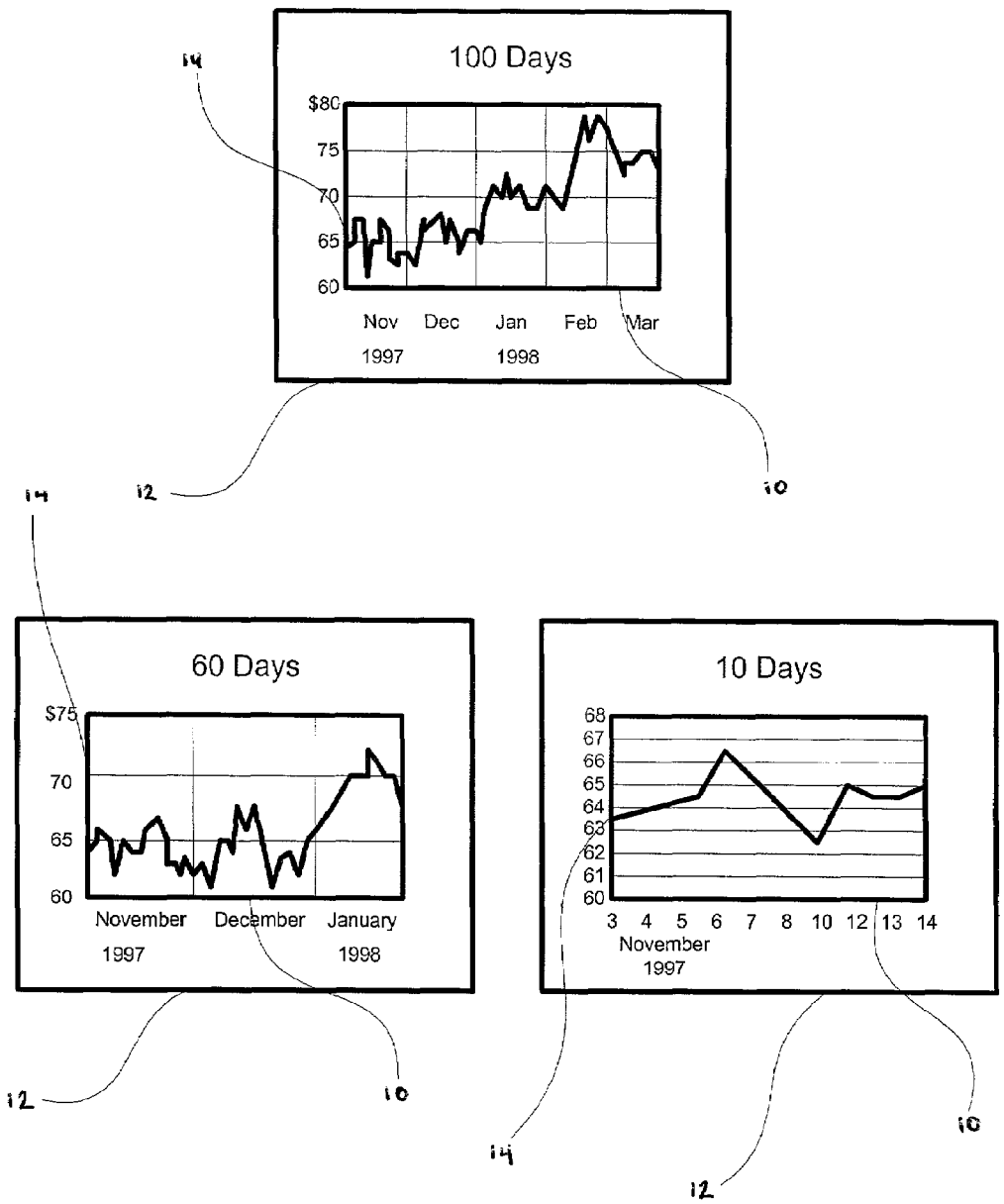
FIG. 3 provides various sample graphs may be outputted by the present invention.

The output of the software program is a labeled graph such as the one shown in FIG. 2. Further examples of outputted labeled graphs are shown in FIG. 3. As provided in these figures, typically, the x-axis of the graph is the time axis 10 and the y-axis is the informational data axis 14. Each of the graphs has multi-level time labels 12 on the time axis 10. Multi-level time labels 12 are composed of time based data and have multiple levels or rows. Multi-level time labels often contain abbreviated time units. Further, another language for the multi-level time labels may be utilized. As seen in FIG. 3, the multi-level time labels vary with the amount, type and variation of the input data. In other words, the format of the multi-level time labels is driven by the input data. Thus, the layout, format, and spacing of the multi-level time labels are customized to best label a chart with the input data provided.

Overall, the method of automatically labeling a time axis of a graph with time based data includes six steps. A flow diagram of the steps is provided in FIG. 4. First, a set of time labels is generated 16 by processing the input data 2. Second, a multi-level data structure is created 18. Third, the time labels are stored in the multi-level data structure 20. Fourth, the multi-level data structure is then processed to refine the time labels 22. Fifth, multi-level time labels are generated from the time labels stored in the multi-level data structure 24 sixth, the multi-level time labels are used to label the axis of the graph 26. Finally, the labeled graph is outputted to a display device. The present invention may be implemented with software or hardware. A software programming language such as Java is appropriate.

Step 16 describes generating a set of time labels. A flow diagram of the process that generates a set of time labels is provided in FIG. 5. The input parameters (length of the time axis, size and type of font, the timestamps, and the time units) are examined in this step. First, an initial set of time labels is created by reviewing the inputted timestamps and time units 29. Starting with the least varying time unit of the timestamps (such as YEAR), and ending with the most varying time unit to the timestamps (such as SECOND), each of the time unit hierarchies is traversed. Each level of the time dimension hierarchy is reviewed and a set of time labels is generated to correspond with that level. Those labels are then checked to see if they fit along the time axis 30. If they fit, then the next level of the time dimension hierarchy is reviewed. The initial set of time labels includes the labels for all dimensions which fit along the time axis. If the set of time labels do not fit, then an abbreviated set of time labels is created 34. The abbreviated set of time labels is then checked to determine if the set will fit along the time axis without overlapping 30. If the abbreviated set of time labels fits then that set is included as one of the time label sets 37. The set of time labels is saved and the next step of the method is to proceed to the "current" time dimension hierarchy level 30. If the set of time labels does not fit, then a subset of time label is created 36. The subset of time labels is then checked to determine if the set will fit along the time axis without overlapping 30. If the subset of time labels fits then that set is included as one of the time label sets 37. The set of time labels is saved and the next step of the method is to proceed to the "current" time dimension hierarchy level 42 and check to see if the the set of time labels fit along the time axis without overlapping 30. If the set of time labels do not fit, then the method ceases 48.

Step 30 accepts the initial set of time labels and determines whether the initial time labels can be written in the allotted space on the time axis 10. The lengths of each time label and an appropriate inter-label spacing constant is summed. The inter-label spacing constant is a predetermined minimum distance between each time label, the inter-label spacing constant may vary depending upon the font utilized.

Figure 4:
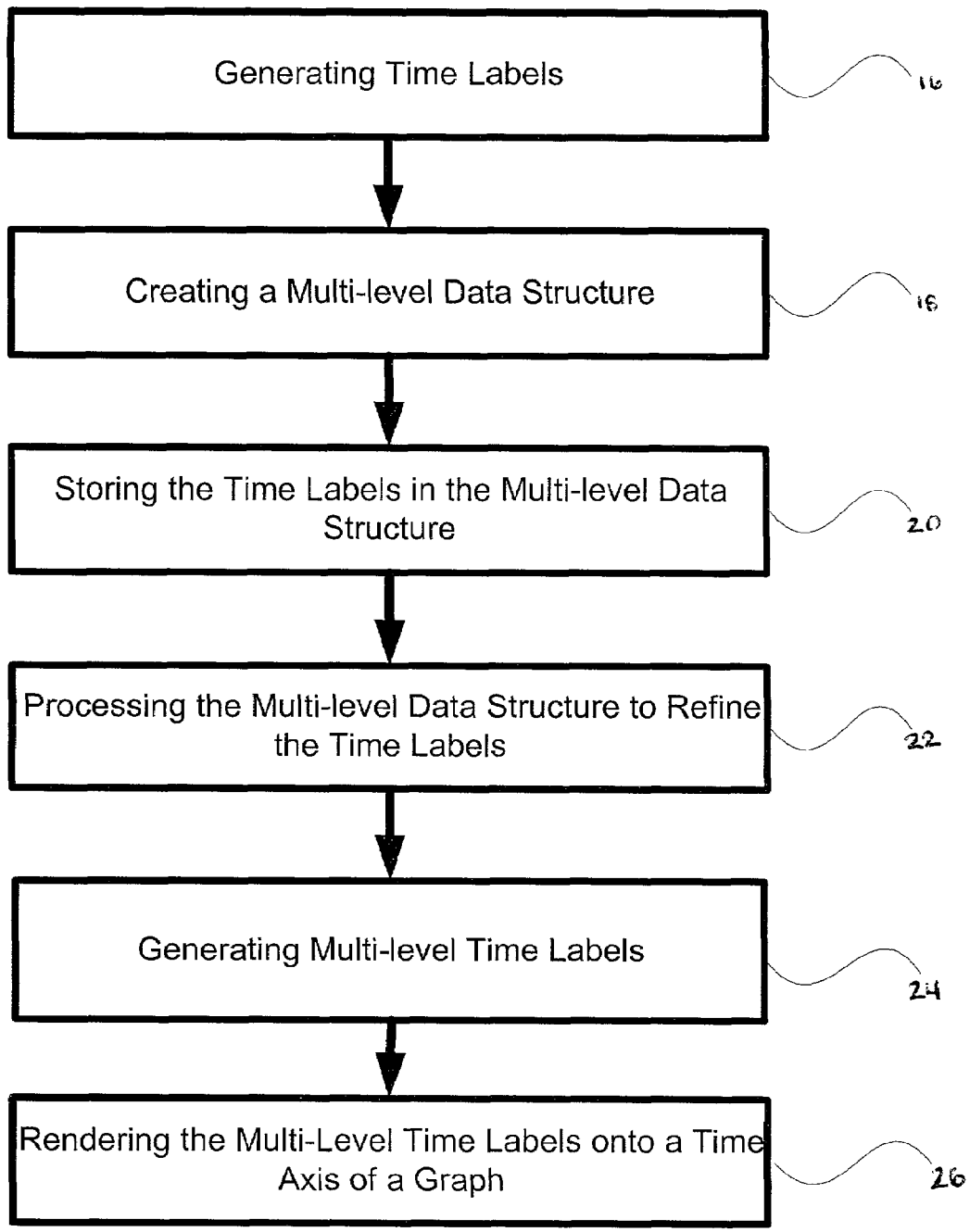
FIG. 4 is a flow diagram of the automated labeling process.

The sum is compared with the length of the time axis 10. If step 30 determines that the initial time labels will fit in the allotted space on the time axis 10 then those time labels will be used and the next step 18, referred to in FIG. 4, is performed. If step 30 determines that the time labels will not fit on the time axis 10 without overlapping then, the program creates an abbreviated set 34 of those time labels.

Step 34 generates an abbreviated version of the time labels. Abbreviations may be predefined or user defined. In addition, for the year unit, label prefixes may be factored (e.g. 1995, '96 '97 '98 '99 2000). The abbreviated version is an adaptation of the original time labels; the abbreviated version contains all of the original time labels in abbreviated form. For example, if the unit name is supposed to display year and month ("full year" over "full month"), two abbreviated versions may be generated. One abbreviated version may be the "two digit year" over the "abbreviated month" and the other abbreviated version may be "full year" over several "single character months". Each of these abbreviated versions is tested in step 30 to determine if the abbreviated version of the time labels will fit along the time axis 10. If either abbreviated version fits then those abbreviated time labels will be used and the next step 18, referred to in FIG. 4, is performed. If neither abbreviated version fits on the time axis, then the program creates a time label subset 36.

Step 36 generates a subset of the time labels. For example, assume the time labels were every year from 1975 to 2000. Ever fifth label may be selected yielding the subset 1975 1980 1985 1990 1995 2000; this would be a subset of time labels. A label constant may be considered by the program to produce a more recognizable subset. The label constant determines the frequency of the time label. The frequency is the amount of time a label occurs. The label constant guides the software program in choosing a more comprehendible subset. The label constant is dependent on the time unit and may vary for each time unit. For example, consider the situation where the step 36 generates a subset containing every $13^{th}$ label. But, every $13^{th}$ label is not easily recognized. If the label constant is used and is set at 5, every $15^{th}$ label is chosen because it is the next frequency of label that is divisible by the label constant. Also, a threshold may be used in step 36. For example, assume the threshold is set at 30 and the label constant is set at 5. The original set of data (11 to 45 seconds) translates 11 to 40 seconds→15 seconds, 16 seconds to 19 seconds→20 seconds, 21 seconds to 29 seconds→to 30 seconds. All periods greater than 30 seconds are rounded to a minute. Also, a mapping function may be used that will map certain data or data ranges to other values. Thus, label constants, thresholds, and mapping functions assist in generating a set of labels that is standard and identifiable.

Figure 5:
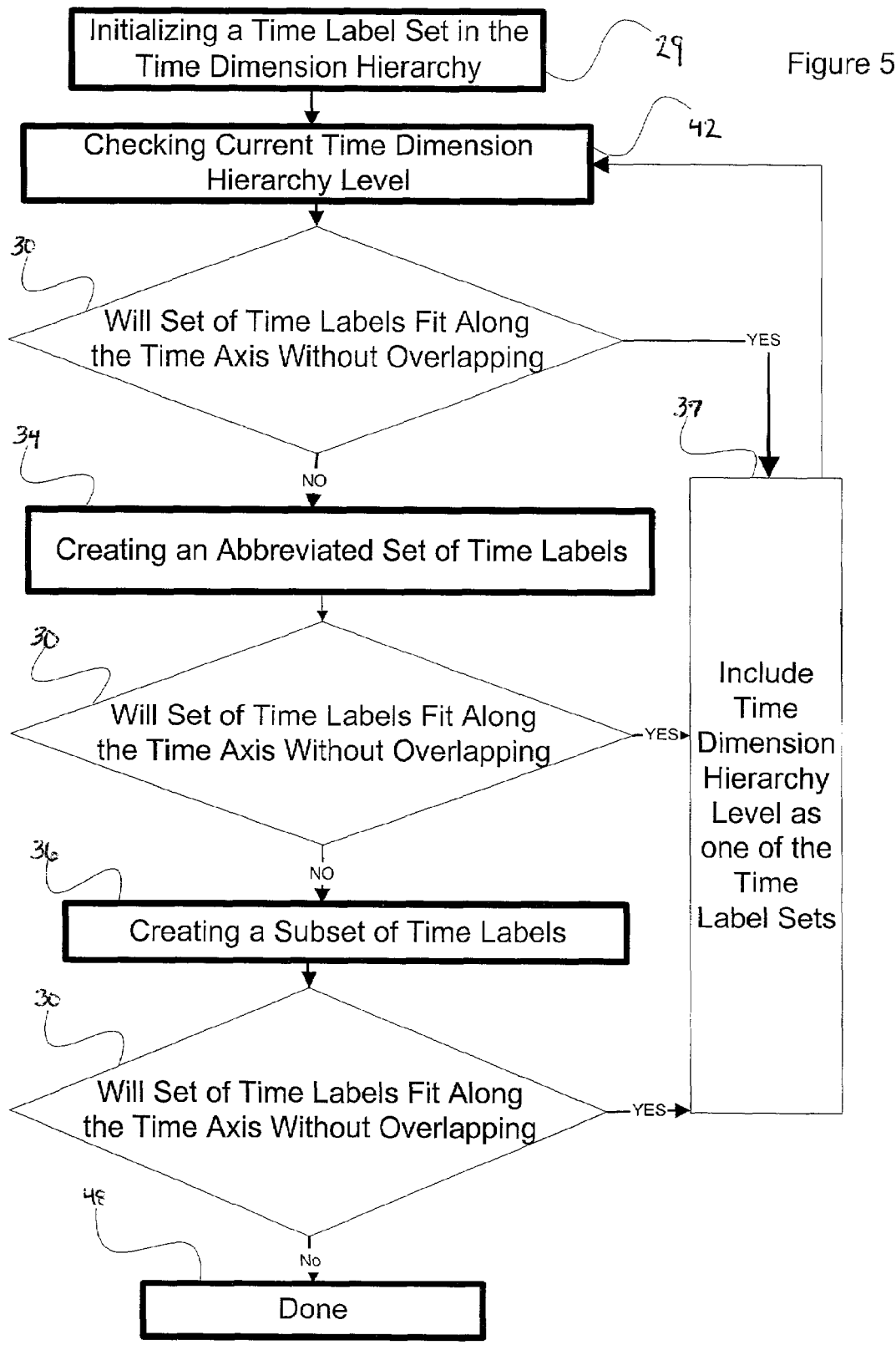
FIG. 5 is a flow diagram showing the details of generating the time labels.

Once a subset of time labels is generated, the program initiates step 30 to determine if the subset fits along the time axis. If the subset fits, then that subset of time labels is used and the next step 18, referred to in FIG. 4, is performed. If the subset fails step 30, an abbreviated version of the subset is generated. The process is FIG. 5 is repeated until a set of time labels 14 is generated that will fit along the time axis 10 without overlapping. Then those time labels will be used and the next step 18, referred to in FIG. 4, is performed.

Step 18 is creating a multi-level data structure 38. Pictorial examples of multi-level data structures 38 are shown in FIGS. 6a and 6b. The multi-level data structure 38 may be viewed as an array. The multi-level data structure 38 has areas to store time labels as character strings. The multi-level data structure 38 has an internal index system that is independent of any display device 6. This index system allows the formatting of the time labels to be compatible with any display device. The index is a set of coordinates for each time label. Later in the process, the indexes are translated to a display's system so that the graph can be properly displayed.

Step 20 is storing the time labels in the multi-level data structure 28. Time labels are stored in a multi-level data structure 38 with one time unit per level. The multi-level data structure 38 is populated by reviewing the frequency of the time units of the labels. The frequency is the amount of time a unit occurs in a given period. For example, seconds have a higher frequency then minutes and minutes has a higher frequency then hours. The time labels with the highest unit frequency are stored at the "logical" top of the multi-level data structure 38. Then, in descending order of unit frequency, the time labels stored on each level of the multi-level data structure 38. If there is no difference in the frequency of the time units, the order of time labels is not set (for example, numeric days and character days). For example, referring to FIG. 6a, hours are stored on the top level L0, days are stored on a middle level L1, numeric days are stored on the next level L2, months are stored on level L3 and years are stored on the bottom level L4. Each level contains one or more time labels but only one time unit. The multi-level data structure 38 also stores the layout of the time labels.

While storing the time labels in the multi-level data structure 38, each time label is indexed. The time label has a start and an end index. This is demonstrated in the following example. Assume the time labels are 01-Nov-1999 01-Dec-1999 01-Jan-2000 01-Feb-2000 01-Mar-2000. The multi-level data structure would be:

Level 0: Nov[0,1], Dec [1,2], Jan[2,3] Feb [3,4], Mar [4,5]

Level 1: 1999 [0,2], 2000 [2,5]

The indexes provide the information necessary to align the time labels relative to each other. For example, 1999 [0,2] is located on level 1, the label character string is 1999, the starting index is 0 and the ending index is 2. This means that the label "1999" occupies the interval on level 1 that corresponds with data spaces 0 to 2. This is a device independent representation. An example of a section of a Java software program is provided to more clearly illustrate how this step may be implemented. The following code sets forth the character string (i.e. the actual time label), and the starting index.

```
Class label          {
String labelString;   // The actual label to write; the character string
int start_index;      // start index of interval (of Tstamp[ ])
int end_index;        // end index of interval (of Tstamp[ ])
}
```

The next portion of code defines a vector that corresponds to one level of the multi-level data structure 38. This data structure is a vector of labels.

```
Private class Linelabel {
    Vector Vlabel = new Vector ( );
}
```

Finally the vector/level is assigned a particular time unit. The data structure is a vector of linelabel.

```
Public class Xlabel {
    Vector Xlabel Unit = new Vector( );
    Public class time labels  {
    Vector Time Label Levels = new Vector ( )
```

Step 22 is processing the multi-level data structure 38 to redefine the time labels stored in the multi-level data structure 38. Step 22 extends the precision of the time labels, rewrites time labels, and merges levels in the multi-level data structure 38. The purpose of this step is to redefine the appearance and organization of the time labels.

The multi-level data structure 38 is reviewed to determine if any of the time labels may be made more precise. For example, FIG. 6a has a time label on level L0 that is "5pm." This time label may be rewritten, as shown in FIG. 6b, to be "5:30pm." Typically, the level containing the highest frequency time unit, here L0, is rewritten with extended time precision. In particular, the initial time label and the last time label may be rewritten to make these time labels more precise. Another example of this follows—suppose the first time label started at 9:30, but time labels were generated only for whole hours. This occurred in step 16 because it was determined that there was not enough space to label minutes and there was enough space to label hours. To make the graph more accurate and intuitive, the initial time stamp may be rewritten. So, in this example the following transformation may take place if 9:30 will fit into the allotted space.

```
9  10  11  12 . . .   =>   9:30  10  11  12 . . .
```

The transformation is important because it more accurately displays the precision of the initial timestamp.

Next, invariant time labels may be merged. An invariant time label is a label where there is only one label in a level; examples are provided below. There may be levels that contain only one time label. These are termed invariant time labels, and are merged into other levels. Examples of invariant time labels are shown in FIG. 6a. L3 Nov.[0,8] and L4 2000 [0,8] are invariant time labels. The first situation where invariant time labels are merged is where all the time labels in the multi-level data structure are invariant time labels. In this case, provided there is enough space, all invariant time labels are merged. For example, if the input was daily timestamps for the month of September 1999, and there was not enough space to write daily time labels, the following transformation would occur:

```
        Sept.       =>        Sept. 1999
        1999
```

The second situation where invariant time labels are merged is where the levels contain both invariant and variant time labels. This is the most general case. The overall strategy is to merge all invariant time labels. For example, the program may make the following transformation so that the time labels are clearer:

```
9 am  10 am  11 am  12 am              9 am  10 am  11 am  12 am
2                              =>       September 2, 1999
September
1999
```

It may be the case that an invariant time label is merged into a single line that contains variant time labels. For example, given that there is enough space for the 2000 to fit after Jan, the following transformation will take place:

```
Jan  Feb  Mar  Apr  =>    Jan 2000    Feb  Mar  Apr
2000
```

Step 24 is generating multi-level time labels 12 from the multi-level data structure 38. Here, the time labels are structurally aggregated. In another words, instead of having individual time labels, the time labels are aggregated with those in the "column" of the multi-level data structure. Thus, a multi-level time label 12 is formed instead of individual time labels.

Step 26 is labeling the graph with the multi-level time labels 12. The multi-level time labels 12 are rendered onto the time axis of the graph. The graph is then displayed. Display devices 6, such as a computer screens, are typically addressed in terms of device display coordinates or pixel coordinates. These device display coordinates indicate where a multi-level time label 12 will be displayed in the image. Functions are used to convert the indexes into device display coordinates. The functions support date arithmetic and provide an interface for extracting time fields, such as year, month, day, hour, etc., from the input data 2. Further, the functions may also convert numerical data to character strings such as "11" to "November". Finally, the chart or graph is produced with an elegantly labeled time axis 10. Examples of outputted graphs are shown in FIG. 3.

Axis markers may also be defined. Axis markers (also known as hash marks) are used to define increments along the time axis that are too small to be labeled. Axis markers may be written for non-labeled time units; axis markers will be written for the lowest frequency non-labeled time unit. Axis markers are defined in a similar fashion to time labels. A vector of axis marker is defined; each axis markers contains indexes that indicate where the axis marker should be written. The indexes are not display device specific. For example, a code could be written in Java such as the one that follows:

```
Class HashMarks    {
    Vector Vmarks = new Vector( );
    Int period = 1;
}
Class Mark    {
    Vector Vmark = new Vector ( );
    Int period = 1;
}
Class Mark {int index}
```

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly it is to be understood that the invention is not to be limited by the specific illustrated embodiments, but only be the scope of the appended claims.

What is claimed is:

1. A computer-implemented method of automatically labeling a graph that includes time based data comprising:
    generating a plurality of time labels where each time label in the plurality of time labels corresponds to hierarchical levels of time, by extracting and analyzing time label information from input data comprising informational data and corresponding time data
    determining whether the time labels in each of the plurality of hierarchical levels of time fit along the time axis based on the informational data;
    if the time labels of a hierarchical level fit along the time axis, including the time labels in an initial time label set;
    creating a multi-level data structure;
    storing the time labels in the initial time label set in the multi-level data structure;
    processing the multi-level data structure to redefine the time labels;
    generating multi-level time labels from the time labels that are stored in the multi-level data structure, each multi-level time label comprising a plurality of rows of time labels; and
    applying the generated multi-level time labels to the time axis of a graph so that the generated multi-level time label serves as a label for that axis.

2. The method of automatically labeling a time axis of a graph according to claim 1 further comprising the step of assigning indexes to each of the time labels in the multi-level data structure.

3. The method of automatically labeling a time axis of a graph according to claim 1 further comprising the steps of:
    generating axis markers; and
    labeling the time axis of the graph with the axis markers.

4. The method of automatically labeling a time axis of a graph according to claim 1 further comprising the step of assigning indexes to each of the time labels in the multi-level data structure.

5. The method of automatically labeling a time axis of a graph according to claim 1 whereas the step of generating time labels comprises the step of:
    if the time labels of a hierarchical level does not fit along the time axis, including the time labels in an abbreviated time label set; and
    generating the abbreviated set of time labels.

6. The method of automatically labeling a time axis of a graph according to claim 5 further comprising determining whether the abbreviated set of time labels fit along the time axis comprises:

summing the length of each time label in the abbreviated set of time labels and an inter-label spacing constant; and comparing the sum with the length of the time axis.

7. The method of automatically labeling a time axis of a graph according to claim 1, whereas the step of determining whether the initial set of time labels fit along the time axis comprises:

summing the length of each time label in the initial set of time labels and an inter-label spacing constant and comparing the sum with the length of the time axis.

8. The method of automatically labeling a time axis of a graph according to claim 1 whereas the step of processing the multi-level data structure to redefine the time labels comprises extending the precision of the time labels.

9. The method of automatically labeling a time axis of a graph according to claim 1 whereas the step of processing the multi-level data structure to redefine the time labels comprises merging the levels in the multi-level data structure.

10. A computer implemented method of automatically labeling a time axis of a graph that includes time based data comprising:

generating a plurality of time labels, where each time label in the plurality of time labels corresponds to hierarchical levels of time, by extracting and analyzing time label information from input data comprising informational data and corresponding time data;

determining whether the time labels in each of the plurality of hierarchical levels of time fit along the time axis based on the informational data;

if the time labels of a hierarchical level fit along the time axis, including the time labels in an initial time label set;

generating a multi-level data structure to store the time labels;

populating the multi-level data structure with the time labels;

refining the time labels in the multi-level data structure;

generating multi-level time labels from the time labels that are stored in the multi-level data structure, each multi-level time label comprising a plurality of rows of time labels;

defining axis markers that be displayed on the time axis; and applying the generated multi-level time labels to the time axis of a graph so that the generated multi-level time label serves as a label for that axis.

11. A system for performing a method automatically labeling a time axis of a graph that includes time based data comprising:

a processor operable to execute computer program instructions; and a memory operable to store computer program instructions executable by the processor, for performing the steps of:

generating a plurality of time labels where each time label in the plurality of time labels corresponds to hierarchical levels of time, by extracting and analyzing time label information from input data comprising informational data and corresponding time data;

determining whether the time labels in each of the plurality of hierarchical levels of time fit along the time axis based on the informational data;

if the time labels of a hierarchical level fit along the time axis, including the time labels in an initial time label set;

creating a multi-level data structure;

storing the time labels in the initial time label set in the multi-level data structure;

processing the multi-level data structure to redefine the time labels;

generating multi-level time labels from the time labels that are stored in the multi-level data structure, each multi-level time label comprising a plurality of rows of time labels; and applying the generated multi-level time labels to the time axis of a graph so that the generated multi-level time label serves as a label for that axis.

12. A system for performing a method of automatically labeling a time axis of a graph according to claim 11 further comprising the step of assigning indexes to each of the time labels in the multi-level data structure.

13. A system for performing a method of automatically labeling a time axis of a graph according to claim 11 further comprising the steps of:

generating axis markers; and labeling the time axis of the graph with the axis markers.

14. A system for performing a method of automatically labeling a time axis of a graph according to claim 11 further comprising the step of:

assigning indexes to each of the time labels in the multi-level data structure.

15. A system for performing a method of automatically labeling a time axis of a graph according to claim 11 whereas the step of generating time labels comprises the steps of:

if the time labels of a hierarchical level does not fit along the time axis, including the time labels in an abbreviated time label set; and generating the set of time labels.

16. A system for performing a method of automatically labeling a time axis of a graph according to claim 15 further comprising a memory operable to store computer program instructions executable by the processor, for performing the steps of determining whether the abbreviated set of time labels fit along the time axis comprises:

summing the length of each time label in the abbreviated set of time labels and an inter-label spacing constant, and comparing the sum with the length of the time axis.

17. A system for performing a method of automatically labeling a time axis of a graph according to claim 11 whereas the step of determining whether the initial set of time labels fit along the time axis comprises:

summing the length of each time label in the initial set of time labels and an inter-label spacing constant; and comparing the sum with the length of the time axis.

18. A system for performing a method of automatically labeling a time axis of a graph according to claim 11 whereas the step of processing the multi-level data structure to refine the time labels comprises extending the precision of the time labels.

19. A system for performing a method of automatically labeling a time axis of a graph according to claim 11 whereas the step of processing the multi-level data structure to refine the time labels comprises merging the levels in the multi-level data structure.

20. A computer program product for performing a method of automatically labeling a time axis of a graph that includes time based data process in a system, comprising:

a computer readable storage medium; and computer program instructions, recorded on the computer readable storage medium, executable by a processor, for performing the steps of:

generating a plurality of time labels, where each time label in the plurality of time labels corresponds to hierarchical levels of time, by extracting and analyzing time label information from input data comprising informational data and corresponding time data;

determining whether the time labels in each of the plurality of hierarchical levels of time fit along the time axis based on the informational data;

if the time labels of a hierarchical level fit along the time axis, including the time labels in an initial time label set;

creating a multi-level data structure;

storing the time labels in the initial time label set in the multi-level data structure;

processing the multi-level data structure to refine the time labels;

generating multi-level time labels from the time labels that are stored in the multi-level data structure, each multi-level time label comprising a plurality of rows of time labels; and applying the generated multi-level time labels to the time axis of a graph so that the generated multi-level time label serves as a label for that axis.

21. A computer program product for performing a method of automatically labeling a time axis of a graph according to claim 20 further comprising the step of assigning indexes to each of the time labels in the multi-level data structure.

22. A computer program product for performing a method of automatically labeling a time axis of a graph according to claim 20 further comprising the steps of:

generating axis markers; and labeling the time axis of the graph with the axis markers.

23. A computer program product for performing a method of automatically labeling a time axis of a graph according to claim 20 further comprising the step of:

assigning indexes to each of the time labels in the multi-level data structure.

24. A computer program product for performing a method of automatically labeling a time axis of a graph according to claim 20 whereas the step of generating time labels comprises the steps of:

if the time labels of a hierarchical level does not fit along the time axis, including the time labels in an abbreviated time label set;

generating the abbreviated set of time labels.

25. A computer program product for performing a method of automatically labeling a time axis of a graph according to claim 24 further comprising determining whether the abbreviated set of time labels fit along the time axis comprises:

summing the length of each time label in the abbreviated set of time labels and an inter-label spacing constant; and comparing the sum with the length of the time axis.

26. A computer program product for performing a method of automatically labeling a time axis of a graph according to claim 20 whereas the step of determining whether the initial set of time labels fit along the time axis comprises:

summing the length of each time label in the initial set of time labels and an inter-label spacing constant; and comparing the sum with the length of the time axis.

27. A computer program product for performing a method of automatically labeling a time axis of a graph according to claim 20 whereas the step of processing the multi-level data structure to refine the time labels comprises extending the precision of the time labels.

28. A computer program product for performing a method of automatically labeling a time axis of a graph according to claim 20 whereas the step of processing the multi-level data structure to refine the time labels comprises merging the levels in the multi-level data structure.

* * * * *

UNITED STATES PATENT AND TRADEMARK OFFICE
CERTIFICATE OF CORRECTION

| | | |
|---|---|---|
| PATENT NO. | : 7,146,374 B1 | |
| APPLICATION NO. | : 09/788459 | |
| DATED | : December 5, 2006 | |
| INVENTOR(S) | : Lory Dean Molesky | |

It is certified that error appears in the above-identified patent and that said Letters Patent is hereby corrected as shown below:

Title Page

Item (73), Assignee, "Oracle Corporation, Redwood Shores, CA (US)" should read --Oracle International Corporation, Redwood Shores, CA (US)--

Signed and Sealed this

Twenty-seventh Day of February, 2007

JON W. DUDAS
*Director of the United States Patent and Trademark Office*